Patented Feb. 21, 1933

1,898,911

UNITED STATES PATENT OFFICE

FRITZ STRAUB AND WILLI WIDMER, OF BASEL, SWITZERLAND, ASSIGNORS TO THE FIRM SOCIETY OF CHEMICAL INDUSTRY IN BASLE, OF BASEL, SWITZERLAND

METALLIFEROUS AZO-DYESTUFFS AND PROCESS OF MAKING SAME

No Drawing. Application filed November 30, 1931, Serial No. 578,202, and in Switzerland December 16, 1930.

The present invention relates to the manufacture of new metalliferous azo-dyestuffs. It comprises the process of making these dyestuffs, as well as the new dyestuffs themselves.

According to the present invention new dyestuffs can be obtained by coupling a diazo-compound of the general formula

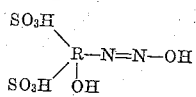

wherein R stands for a phenyl or naphthyl radicle, and the hydroxy group directly attached to R stands in ortho-position to the azo-group, with a coupling component of the general formula

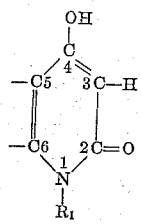

wherein $R_1$ stands for hydrogen, alkyl, aralkyl or aryl, and the carbon atoms numbered 5 and 6 belong to a phenyl or naphthyl residue.

As diazo components there may be used the diazotized ortho-hydroxyaminodisulfonic acids of the benzene or naphthalene series, for example diazotized 2-amino-1-phenol-4:6-disulfonic acid, 1-amino-2-phenol-4:6-disulfonic acid, 2-amino-1-hydroxynaphthalene-4:8-disulfonic acid, and 2-amino-1-hydroxynaphthalene-3:8-disulfonic acid.

The coupling components may be derived from the most varied primary and secondary aromatic mono-amines. Simple coupling components, such as for example 2:4-dihydroxyquinoline, 1-methyl-, 1-ethyl-, 1-benzyl-, 1-phenyl- or 1-naphthyl-2:4-dihydroxyquinoline, and 5:6-, 6:7- and 7:8- benzo-2:4-dihydroxyquinolines may be made, for example, from anthranilic acid, N-methyl-, N-ethyl-, N-benzyl-, N-phenyl-, N-naphthylanthranilic acid or the esters thereof, naphthylamines or 2-naphthylamine-3-carboxylic acid, or substitution products of any of these substances containing in the nucleus halogen, $NO_2$, $SO_3H$ or O-alkyl.

There may however also be used dihydroxyquinolines or di-(2:4-dihydroxyquinolines) of more complicated constitution, the latter being capable of coupling twice. Such dihydroxyquinolines may be obtained for example from the ortho-aminocarboxylic acids or the esters thereof which derive from benzidines, aminobenzimidazoles, aminoazobenzenes, aminobenzothiazoles, aminostilbenes, aminoarylethers, aminocarbazoles, amino-diarylmethanes, or substitution products of any of these compounds.

The dyestuffs obtainable in accordance with this invention dye vegetable and animal fibers various shades; by after-treatment of the dyeings with agents which yield metal, for example a chromium or copper compound, their shades may be altered and their properties of fastness improved.

Particularly valuable products are obtained by treating the dyestuffs of this invention of the general formula

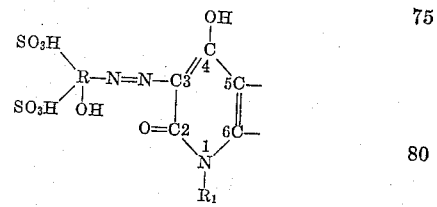

wherein R stands for a phenyl or naphthyl radicle, the hydroxy group attached to R stands in ortho-position to the azo-group, $R_1$ stands for hydrogen, alkyl, aralkyl or aryl, and the carbon atoms numbered 5 and 6 belong to a phenyl or naphthyl residue, in substance with agents yielding metal which are capable of forming complex metal compounds with dyestuffs containing groups which combine with mordants; such agents yielding metal are for example the compounds of chromium, copper, iron, cobalt, nickel, manganese, zinc, vanadium and titanium. There are thus obtained metalliferous dyestuffs which may contain only one metal, or may contain several metals; in the manufacture of dyestuffs containing several metals, the several agents yielding metal may be caused to react with the dyestuff simultaneously or in succession.

The dyestuffs may be treated with the agents yielding metal in an acid, neutral or alkaline medium, with or without suitable additions, and in an open vessel or under pressure; the treatment may occur in the course of the manufacture of the parent dyestuff or in the dye-bath.

The complex metal compounds obtainable in accordance with the invention are very readily soluble in water; they may be applied for dyeing or coloring materials of any kind, such as wool, loaded or unloaded silk, cotton, leather, artificial silks of regenerated cellulose, cellulose esters and cellulose ethers, and varnishes having a basis of cellulose, a neutral resin or an artificial resin; they are also useful as pigment dyestuffs. They dye material yellowish-red, red to violet, very well equalized pure shades; the dyeings are very fast towards water, washing, alkali, fulling and light.

The following examples illustrate the invention, the parts being by weight:—

Example 1

269 parts of 2-amino-1-phenol-4:6-disulfonic acid are suspended in 400 parts of water and diazotized in the usual manner by means of 69 parts of sodium nitrite whilst cooling with ice. The diazo-solution is allowed to run into a mixture cooled by means of ice to 10° C., of 800 parts of water, 170 parts of 2:4-dihydroxyquinoline, 45 parts of caustic soda and 100 parts of calcined sodium carbonate, whilst stirring. When coupling is complete, the dyestuff of the formula

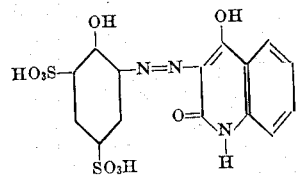

is precipitated by means of common salt and separated by filtration. When dry, it is a dark brown red powder which dissolves in water to a blue red solution, in caustic soda solution of 10 per cent. strength to an orange solution, in aqueous sodium carbonate solution of 10 per cent. strength to an orange-red solution, and in cencentrated sulfuric acid to an orange-yellow solution. The dyestuff dyes wool in an acetic acid bath yellow brown shades, by after chroming the dyeings on the fiber a yellowish red shade is obtained.

Example 2

480 parts of the azo-dyestuff made as described in Example 1 are stirred with 7500 parts of water and there is added a solution of chromium sulfate made from 88 parts of chromium oxide, 170 parts of concentrated sulfuric acid and 600 parts of water. The mixture is heated to boiling for 18–20 hours in a reflux apparatus and the chromium compound of the dyestuff is then precipitated by the addition of common salt. The dried dyestuff is a red brown powder which dissolves in water to a red solution, in a solution of caustic soda or sodium carbonate of 10 per cent. strength to an orange-red solution and in concentrated sulfuric acid to an orange yellow solution. The dyestuff dyes wool in a sulfuric acid bath very even bright yellowish red shades of good fastness to light and fulling.

Example 3

313 parts of the sodium salt of 2-amino-1-phenol-4:6-disulfonic acid are diazotized in the usual manner and the diazo-solution is allowed to run into a mixture, cooled by means of ice to 10° C. of 1000 parts of water, 220 parts of 7:8-benzo-2:4-dihydroxyquinoline, 45 parts of caustic soda and 120 parts of calcined sodium carbonate, whilst stirring. When coupling is completed, the dyestuff of the formula

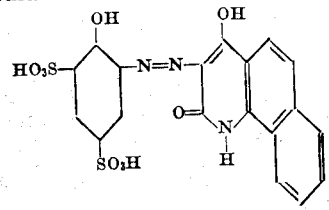

is completely precipitated and seperated by filtration. When dry, it is a dark brown red powder which dissolves in water to a blue red solution, in a solution of caustic soda or sodium carbonate of 10 per cent. strength to an orange solution, and in concentrated sulfuric acid to a brown orange solution. The dyestuff dyes wool in an acetic acid bath brown shades; bluish red shades are obtained by after-chroming the dyeings.

By treating the azo-dyestuffs obtained as described in this example, with chromium sulfate in the manner described in Example 2, there is obtained a dyestuff which when dry is a brown red powder which is very readily soluble in water, in a solution of caustic soda or sodium carbonate of 10 per cent. strength to a red solution, and in concentrated sulfuric acid to an orange yellow solution. In a sulfuric acid bath the dyestuff is very well absorbed by wool, which it dyes very uniform bluish red shades of good fastness to fulling and light.

Example 4

269 parts of 2-amino-1-phenol-4:6-disulfonic acid are diazotized in the manner described in Example 1 and coupled in an alkaline medium with 220 parts of 6:7-benzo- 2:4-dihydroxyquinoline. The dyestuff of the formula

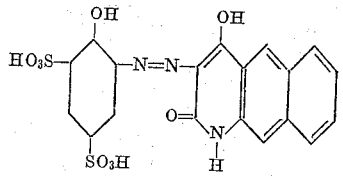

is precipitated by common salt, separated by filtration and dried.

560 parts of this azo-dyestuff are stirred with 7000 parts of water and there is added a solution of chromium formate made from 85 parts of chromium hydroxide, 160 parts of formic acid and 600 parts of water. The mixture is heated to boiling for about 20 hours in a reflux apparatus and the chromium compound of the dyestuff is then precipitated by the addition of common salt. When dried, it is a brown red powder which dissolves in a solution of caustic soda or sodium carbonate of 10 per cent. strength to a red solution and in concentrated sulfuric acid to a blue red solution. The dyestuff dyes wool evenly in a sulfuric acid bath bordeaux red shades of good fastness to fulling and light.

*Example 5*

313 parts of the sodium salt of 2-amino-1-phenol-4:6-disulfonic acid are diazotized in the usual manner and the diazo-solution is allowed to run into a mixture, cooled by means of ice to about 10° C., of 900 parts of water, 245 parts of N-phenyl-2-keto-4-hydroxy quinoline, 42 parts of caustic soda and 110 parts of calcined sodium carbonate, whilst stirring. When coupling is complete, the dyestuff of the formula

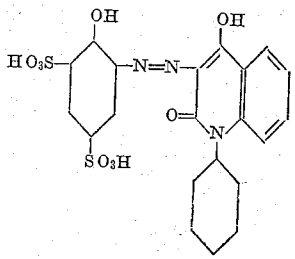

is precipitated by the addition of about 300 parts of common salt and separated by filtration. When dried it is a red brown powder which dissolves in water to a blue red solution, in a solution of caustic soda of 10 per cent. strength to an orange yellow solution, in a solution of sodium carbonate of 10 per cent. strength to an orange red solution, and in concentrated sulfuric acid to a yellow orange solution. The dyestuff dyes wool in an acetic acid bath yellow brown shades; yellowish red shades are obtained by after-chroming the dyeings.

*Example 6*

573 parts of the azo-dyestuff made as described in Example 5 are heated to boiling for about 18 hours together with about 6500 parts of water and a solution of chromium sulfate prepared from 70 parts of chromium hydroxide, 150 parts of sulfuric acid and 600 parts of water. The solution is thereafter neutralized by the addition of caustic soda solution, filtered and concentrated by evaporation. The chromium compound thus obtained is a red brown powder which dissolves in water to a red solution, in a solution of caustic soda or sodium carbonate of 10 per cent. strength to an orange solution, and in concentrated sulfuric acid to an orange yellow solution. The dyestuff dyes wool in a sulfuric acid bath uniform yellowish red shades having good properties of fastness.

*Example 7*

161 parts of 2:4-dihydroxyquinoline are suspended in 1300 parts of water, while stirring, adding then 120 parts of caustic soda. To this suspension 330 parts of diazotized 2-amino-1-hydroxynaphthalene-4:8-disulfonic acid are added, and the whole is stirred for about 40 hours at 30–35° C. After this time the dyestuff of the formula

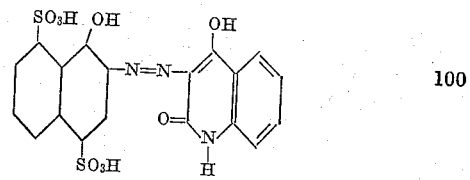

which has formed is filtered off, and washed with a common salt solution of 10 per cent. strength.

The dyestuff paste thus obtained is stirred with 5000 parts of water and mixed with a solution of chromium fluoride prepared from 70 parts of chromium hydroxide, 56 parts of hydrofluoric acid and 600 parts of water. The mixture is heated to the boil for 20 hours in a reflux apparatus and the chromium compound of the dyestuff is then separated by means of common salt. The dried dyestuff is a dark violet-brown powder which dissolves in water to a violet solution, in a solution of caustic soda or sodium carbonate of 10 per cent. strength to a violet red solution, and in concentrated sulfuric acid to a red solution. The dyestuff dyes wool in a sulfuric acid bath very level violet tints having good properties of fastness.

*Example 8*

190 parts of N-ethyl-2-keto-4-hydroxyquinoline are dissolved in 1000 parts of concentrated ammonia, and mixed with 330 parts of diazotized 2-amino-1-hydroxynaphthalene-4:8-disulfonic acid. The whole is stirred for 24 hours at 20-25° C., filtered, and the dyestuff of the formula

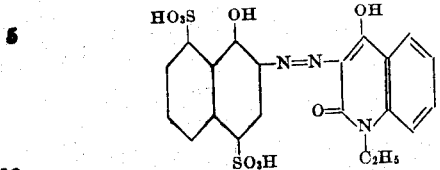

is separated from the filtrate by the addition of common salt.

The resulting dyestuff paste is stirred into 4500 parts of water, and mixed with a solution of chromium fluoride containing 60 parts of chromium hydroxide. The mixture is heated to the boil for 20 hours in a reflux apparatus. After this time the difficulty soluble impurities are separated by filtration, and the chromium compound is precipitated from the filtrate by the addition of common salt. The dried dyestuff is a red-brown powder which dissolves in water to a violet solution, in a solution of caustic soda of 10 per cent. strength to a red solution, in a solution of sodium carbonate of 10 per cent. strength to a red-violet solution, and in concentrated sulfuric acid to a red solution. The dyestuff dyes wool in a sulfuric acid bath level violet tints having good properties of fastness.

We claim:

1. In the manufacture of metalliferous azo-dyestuffs, the step which comprises coupling a diazo-compound of the general formula

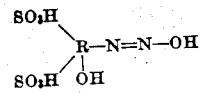

wherein R stands for a phenyl or naphthyl radicle, and the hydroxy group directly attached to R stands in ortho-position to the azo-group, with a coupling component of the general formula

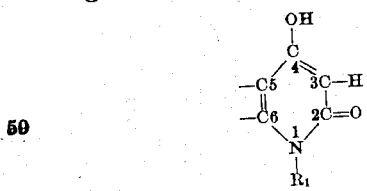

wherein $R_1$ stands for hydrogen, alkyl, benzyl or aryl radicles of the benzene and naphthalene series, and the carbon atoms numbered 5 and 6 belong to a phenyl or naphthyl residue.

2. In the manufacture of chromiferous azo-dyestuffs, the step which comprises coupling a diazo-compound of the general formula

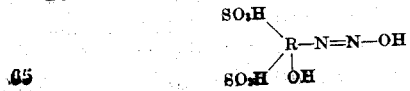

wherein R stands for a phenyl or naphthyl radicle, and the hydroxy group directly attached to R stands in ortho-position to the azo-group, with a coupling component of the general formula

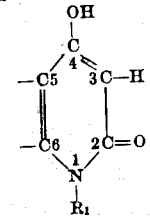

wherein $R_1$ stands for hydrogen, alkyl, benzyl or aryl radicles of the benzene and naphthalene series, and the carbon atoms numbered 5 and 6 belong to a phenyl or naphthyl residue.

3. In the manufacture of chromiferous azo-dyestuffs, the step which comprises coupling a diazo-compound of the general formula

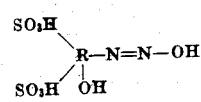

wherein R stands for a phenyl radicle, and the hydroxy group directly attached to R stands in ortho-position to the azo-group, with a coupling component of the general formula

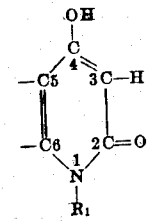

wherein $R_1$ stands for hydrogen, alkyl, benzyl or aryl radicles of the benzene and naphthalene series, and the carbon atoms numbered 5 and 6 belong to a phenyl or naphthyl residue.

4. In the manufacture of chromiferous azo-dyestuffs, the step which comprises coupling the diazo-compound of the formula

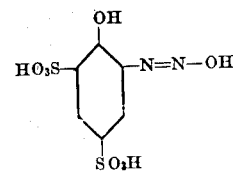

with a coupling component of the general formula

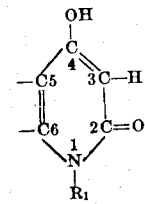

wherein $R_1$ stands for hydrogen, alkyl, benzyl or aryl radicles of the benzene and naphthalene series, and the carbon atoms numbered 5 and 6 belong to a phenyl or naphthyl residue.

5. In the manufacture of the chromiferous azo-dyestuff, the step which comprises coupling the diazo-compound of the formula

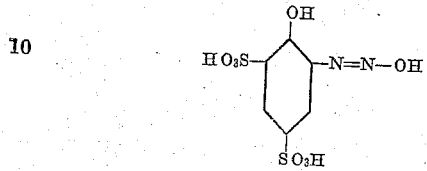

with the coupling component of the formula

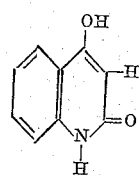

6. In the manufacture of metalliferous azo-dyestuffs, the step which comprises treating with an agent yielding metal capable of forming lakes with the lake-forming group of the azo-dyestuff, azo-dyestuffs of the general formula

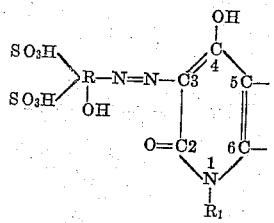

wherein R stands for a phenyl or naphthyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue.

7. In the manufacture of chromiferous azo-dyestuffs, the step which comprises treating with an agent yielding chromium, azo-dyestuffs of the general formula

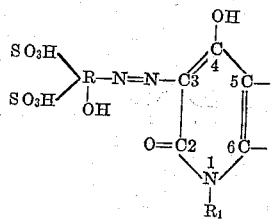

wherein R stands for a phenyl or naphthyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue.

8. In the manufacture of chromiferous azo-dyestuffs, the step which comprises treating with an agent yielding chromium, azo-dyestuffs of the general formula

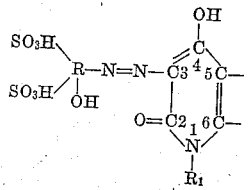

wherein R stands for a phenyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue.

9. In the manufacture of chromiferous azo-dyestuffs, the step which comprises treating with an agent yielding chromium, azo-dyestuffs of the general formula

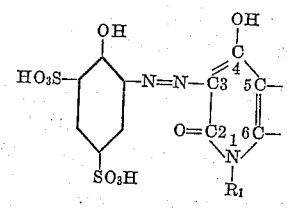

wherein $R_1$ stands for hydrogen, alkyl, benzyl or aryl radicles of the benzene and naphthalene series, and the carbon atoms numbered 5 and 6 belong to a phenyl or naphthyl residue.

10. In the manufacture of the chromiferous azo-dyestuff, the step which comprises treating with an agent yielding chromium, the azo-dyestuff of the formula

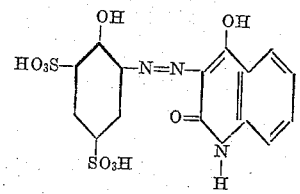

11. Process for the manufacture of a metalliferous azo-dyestuffs, consisting in coupling a diazo-compound of the general formula

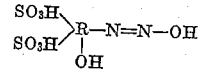

wherein R stands for a phenyl or naphthyl radicle, and the hydroxy group directly attached to R stands in ortho-position to the azo-group, with a coupling component of the general formula

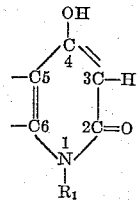

wherein $R_1$ stands for hydrogen, alkyl, benzyl or aryl radicles of the benzene and naphthalene series, and the carbon atoms numbered 5 and 6 belong to a phenyl or naphthyl residue, and then treating the azo-dyestuffs thus obtained of the general formula

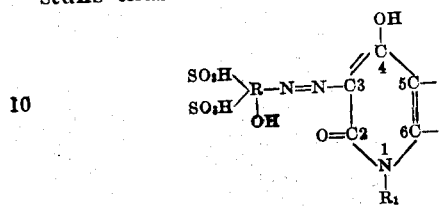

wherein R stands for a phenyl or naphthyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue, with an agent yielding metal capable of forming lakes with the lake-forming group of the azo-dyestuff.

12. Process for the manufacture of chromiferous azo-dyestuffs, consisting in coupling a diazo-compound of the general formula

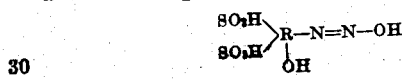

wherein R stands for a phenyl or naphthyl radicle, and the hydroxy group directly attached to R stands in ortho-position to the azo-group, with a coupling component of the general formula

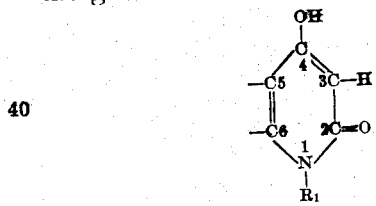

wherein $R_1$ stands for hydrogen, alkyl, benzyl or aryl radicles of the benzene and naphthalene series, and the carbon atoms numbered 5 and 6 belong to a phenyl or naphthyl residue, and then treating the azo-dyestuffs thus obtained of the general formula

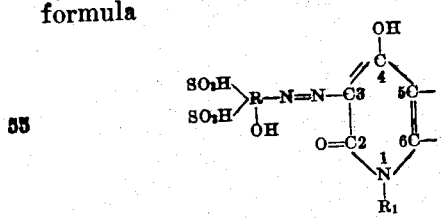

wherein R stands for a phenyl or naphthyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue, an agent yielding chromium.

13. Process for the manufacture of chromiferous azo-dyestuffs, consisting in coupling a diazo-compound of the general formula

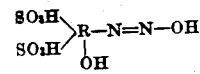

wherein R stands for a phenyl radicle, and the hydroxy group directly attached to R stands in ortho-position to the azo-group, with a coupling component of the general formula

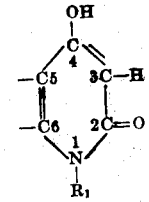

wherein $R_1$ stands for hydrogen, alkyl, benzyl or aryl radicles of the benzene and naphthalene series, and the carbon atoms numbered 5 and 6 belong to a phenyl or naphthyl residue, and then treating the azo-dyestuffs thus obtained of the general formula

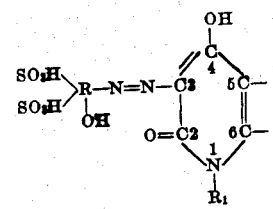

wherein R stands for a phenyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue, with an agent yielding chromium.

14. Process for the manufacture of chromiferous azo-dyestuffs, consisting in coupling the diazo-compound of the formula

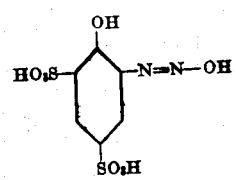

with a coupling component of the general formula

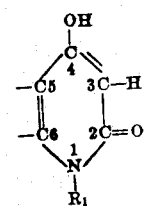

wherein $R_1$ stands for hydrogen, alkyl, benzyl or aryl radicals of the benzene and naphthalene series, and the carbon atoms numbered 5 and 6 belong to a phenyl or naphthyl residue, and then treating the azo-dyestuffs thus obtained of the general formula

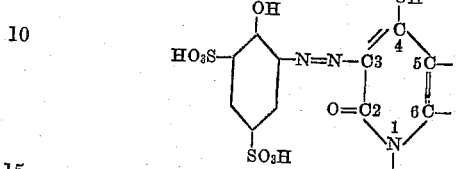

wherein $R_1$ stands for hydrogen, alkyl, benzyl or aryl radicals of the benzene and naphthalene series, and the carbon atoms numbered 5 and 6 belong to a phenyl or naphthyl residue, with an agent yielding chromium.

15. Process for the manufacture of a chromiferous azo-dyestuff, consisting in coupling the diazo-compound of the formula

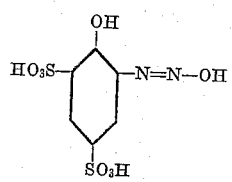

with the coupling component of the formula

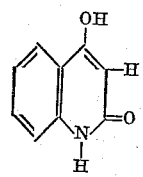

and then treating the azo-dyestuff thus obtained of the formula

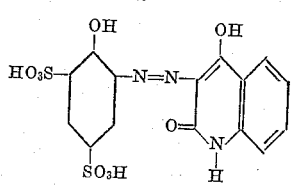

with an agent yielding chromium.

16. As new products the metal compounds of azo-dyestuffs of the general formula

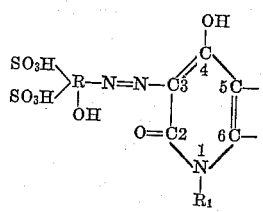

wherein R stands for a phenyl or naphthyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue, which products are orange to red-brown to red to violet colored powders which are very easily soluble in water, and dye vegetable and animal fibers yellowish-red to red to violet tints.

17. As new products the chromium compounds of azo-dyestuffs of the general formula

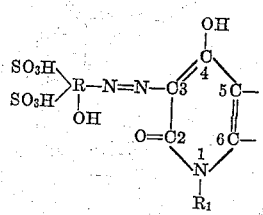

wherein R stands for a phenyl or naphthyl radicle, the hydroxy group attached to R stands in ortho-positoin to the azo-group, $R_1$ stands for hydrogen, alkyl, benzyl or aryl radicles of the benzene and naphthalene series, and the carbon atoms numbered 5 and 6 belong to a phenyl or naphthyl residue, which products are orange to red-brown to red to violet colored powders which are very easily soluble in water, and dye vegetable and animal fibers yellowish-red to red to violet tints.

18. As new products the chromium compounds of azo-dyestuffs of the general formula

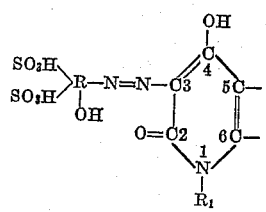

wherein R stands for a phenyl radicle, the hydroxy group attached to R stands in ortho-position to the azo-group, $R_1$ stands for hydrogen, alkyl, benzyl or aryl radicles of the benzene and naphthalene series, and the carbon atoms numbered 5 and 6 belong to a phenyl or naphthyl residue, which products are orange to red-brown to red colored powders which are very easily soluble in water, and dye vegetable and animal fibers yellowish-red to red tints.

19. As new products the chromium compounds of azo-dyestuffs of the general formula

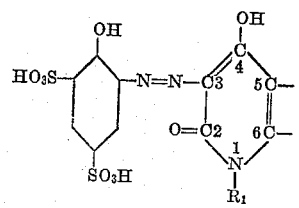

wherein $R_1$ stands for hydrogen, alkyl, benzyl or aryl radicles of the benzene and naphthalene series, and the carbon atoms numbered 5 and 6 belong to a phenyl or naphthyl residue, which products are orange to red-brown to red colored powders which are very easily soluble in water, and dye vegetable and animal fibers yellowish-red to red tints.

20. As a new product the chromium compound of the azo-dyestuff of the formula

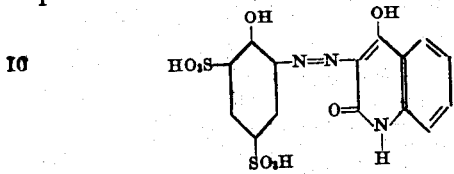

which product is a red-brown powder which is very easily soluble in water, and dyes vegetable and animal fibers yellowish-red tints.

In witness whereof we have hereunto signed our names this 20th day of November, 1931.

FRITZ STRAUB.
WILLI WIDMER.